(12) United States Patent
Kalhan

(10) Patent No.: US 7,515,565 B2
(45) Date of Patent: Apr. 7, 2009

(54) MULTIPLE SOURCE WIRELESS COMMUNICATION SYSTEM AND METHOD

(75) Inventor: Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 691 days.

(21) Appl. No.: 11/125,517

(22) Filed: May 9, 2005

(65) Prior Publication Data

US 2006/0251026 A1    Nov. 9, 2006

(51) Int. Cl.
*H04B 7/216* (2006.01)
(52) U.S. Cl. .................................. 370/335; 370/342
(58) Field of Classification Search ................ 370/335, 370/342; 455/403, 13.3, 524, 509; 375/134, 375/137, 240.24, 341
See application file for complete search history.

(56) References Cited

U.S. PATENT DOCUMENTS

| | | | |
|---|---|---|---|
| 6,314,289 B1 * | 11/2001 | Eberlein et al. | 455/427 |
| 6,411,223 B1 | 6/2002 | Haken et al. | |
| 6,438,165 B2 * | 8/2002 | Normile | 375/240 |
| 6,662,024 B2 | 12/2003 | Walton et al. | |
| 6,732,232 B2 * | 5/2004 | Krishnamurthy | 711/114 |
| 6,845,100 B1 | 1/2005 | Rinne | |
| 6,879,561 B1 | 4/2005 | Zhang et al. | |
| 2002/0145991 A1 | 10/2002 | Miya et al. | |
| 2003/0133457 A1 | 7/2003 | Ono et al. | |

(Continued)

FOREIGN PATENT DOCUMENTS

EP     0531046     3/1993

(Continued)

OTHER PUBLICATIONS

Byers et al., "A Digital Fountain Approach to Reliable Distribution of Bulk Data", Digital Fountain, Inc., Fremont, CA, 12 pgs., publication date unknown.

(Continued)

*Primary Examiner*—CongVan Tran

(57) ABSTRACT

When a cellular wireless communication device can receive communication from multiple (more than one) transmission sources, two steps are performed. First, a block of source data made up of M packets is coded (encoded) such that the block of source data can be derived at the receiver from any K (K=M+A) out of the N packets, where A<M, M<N and N is the total number of coded packets. Second, different subsets of the N packets are sent from each of the transmission sources. The cellular wireless communication device can receive packets from multiple transmission sources. For example, the block of source data can be coded by Reed-Solomon (RS) coding or rateless coding such as Tornado coding or Raptor coding. (Sometimes they are also called Fountain Codes). An example of the multiple sources is multiple base stations in a cellular communication system. Other examples of the multiple sources include multiple sectors, multiple RF channels (multiple frequencies), multiple beams (using a smart antenna system) multiple sets of tones (in an orthogonal frequency division multiplexing based system), and multi-code channel communication systems. Possible applications include W-CDMA, Wi-Max, etc. In real-time applications, such as, for example, voice communications, the real-time requirement may be satisfied in many cases in which the real-time requirements would otherwise fail. For example, in voice over internet protocol (VoIP) communications, a voice call may be clearer, or may avoid being dropped. In another example, better streaming video can be achieved.

7 Claims, 5 Drawing Sheets

U.S. PATENT DOCUMENTS

| | | | |
|---|---|---|---|
| 2003/0200499 | A1 | 10/2003 | Khayrallah |
| 2004/0120411 | A1* | 6/2004 | Walton et al. ............... 375/260 |
| 2004/0228281 | A1 | 11/2004 | Rakotoarivelo et al. |
| 2006/0062243 | A1 | 3/2006 | Dacosta |

FOREIGN PATENT DOCUMENTS

| | | |
|---|---|---|
| WO | WO 02/052787 | 7/2002 |

OTHER PUBLICATIONS

Convolutional code: Meaning; website:http://explanation-guide.info/print/meaning/Convolutional-code.html, publication date unknown.

Digital Fountain Solution for 802.11 Wireless Video, Digital Fountain Inc., Fremont, CA, pp. 1-6, May 18, 2004.

Guizzo, Erico, "Closing in on The Perfect Code", IEEE Spectrum, pp. 36-42, Mar. 2004.

Luby, Michael, "LT Codes", Digital Fountain, Inc., Digital Fountain, Inc., Fremont, CA, 10 pgs., publication date unknown.

Maymounkov, et al., "Rateless Codes and Big Downloads", NYU Dept. of Computer Science, 9 pgs., 2004.

"Mobile Data Boradcast Solutions", Digital Fountain, Inc., Fremont, CA, 4 pgs., publication date unknown.

Reed-Solomon error correction: Meaning; website:http://explanation-guide.info/print/meaning/Reed-Solomon error correction.html, publication date unknown.

TIA Document, "Upper Layer (Layer 3) Signaling Standard for cdma2000 Spread Spectrum Systems", TIA-2000.5-D, Telecommunications Industry Asso., pp. 2/471-2/619, Mar. 2004.

Viterbi algorithm: Meaning; website:http://explanation-guide.info/print/meaning/Viterbi algorithm.html, publication date unknown.

Byers et al., "Accessing Multiple Mirror Sites in Parallel: Using Toronado Codes to Speed Up Downloads", pp. 275-283, (IEEE, Mar. 21, 1999) ISBN: 0-7803-5417-6, XP010323769.

International Search Report (ISR): PCT/ISA/220, 210 for International Application No. PCT/US2006/026191, ISR dated Nov. 22, 2006, 7 pages.

\* cited by examiner

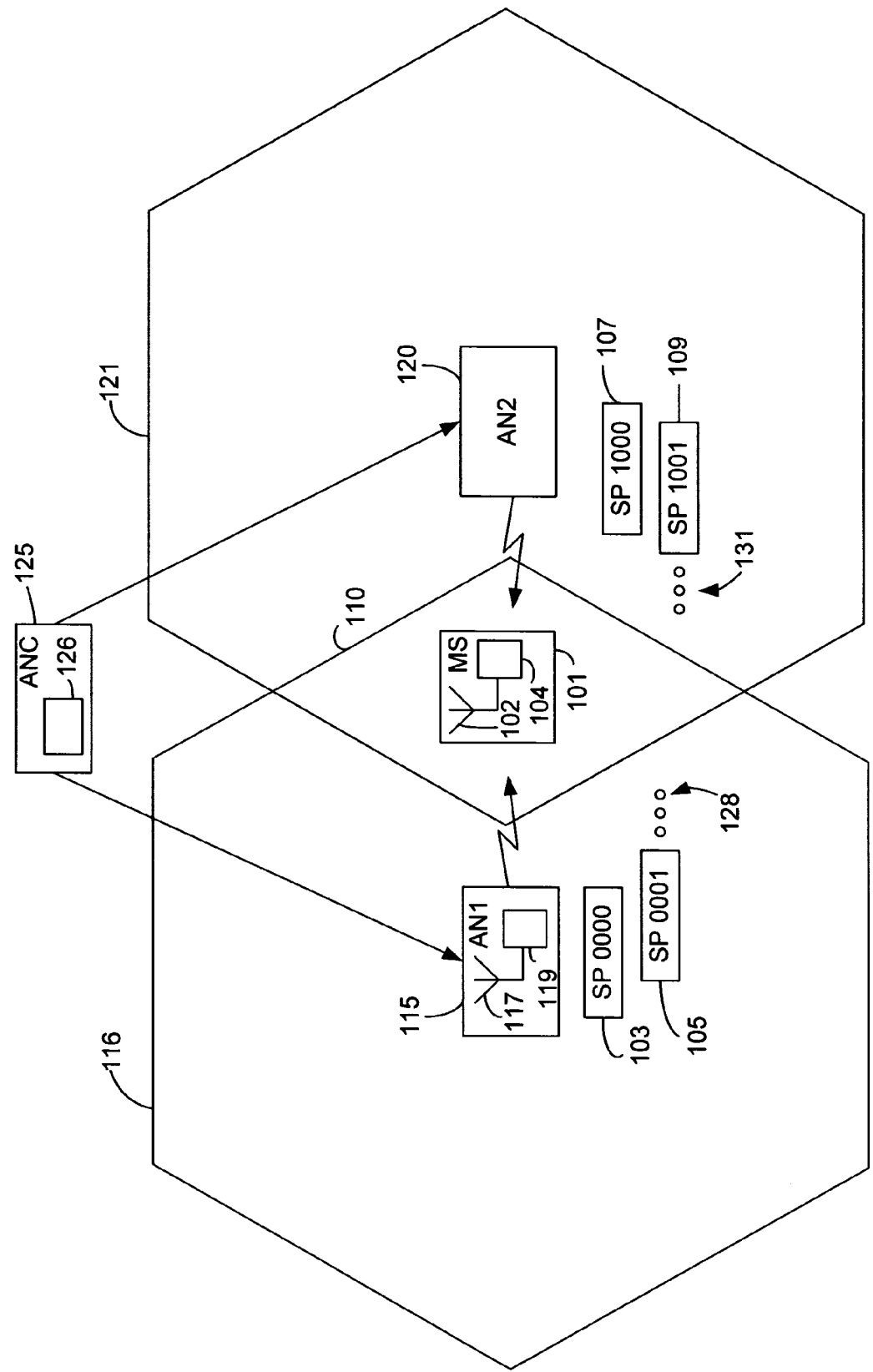

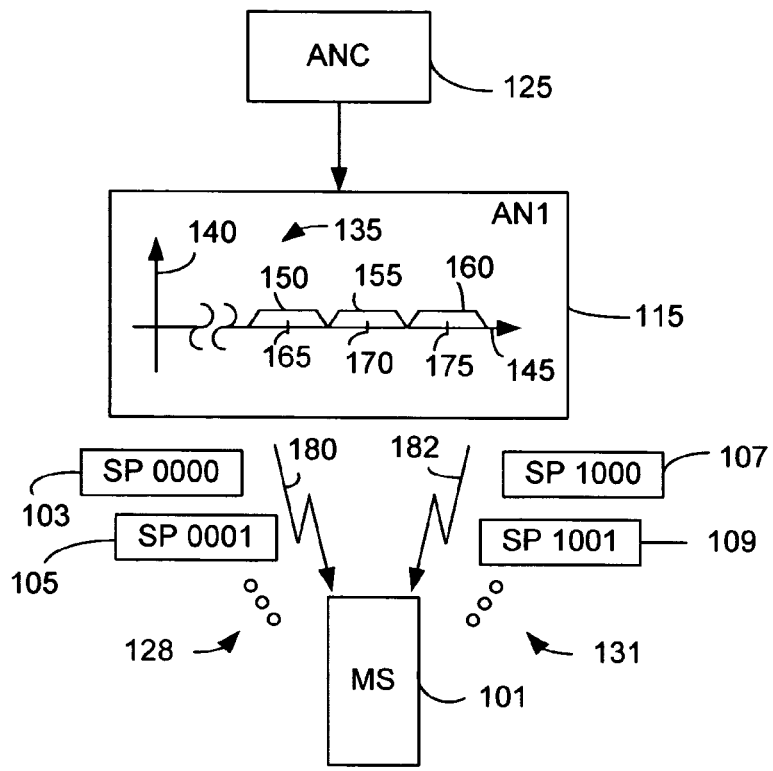
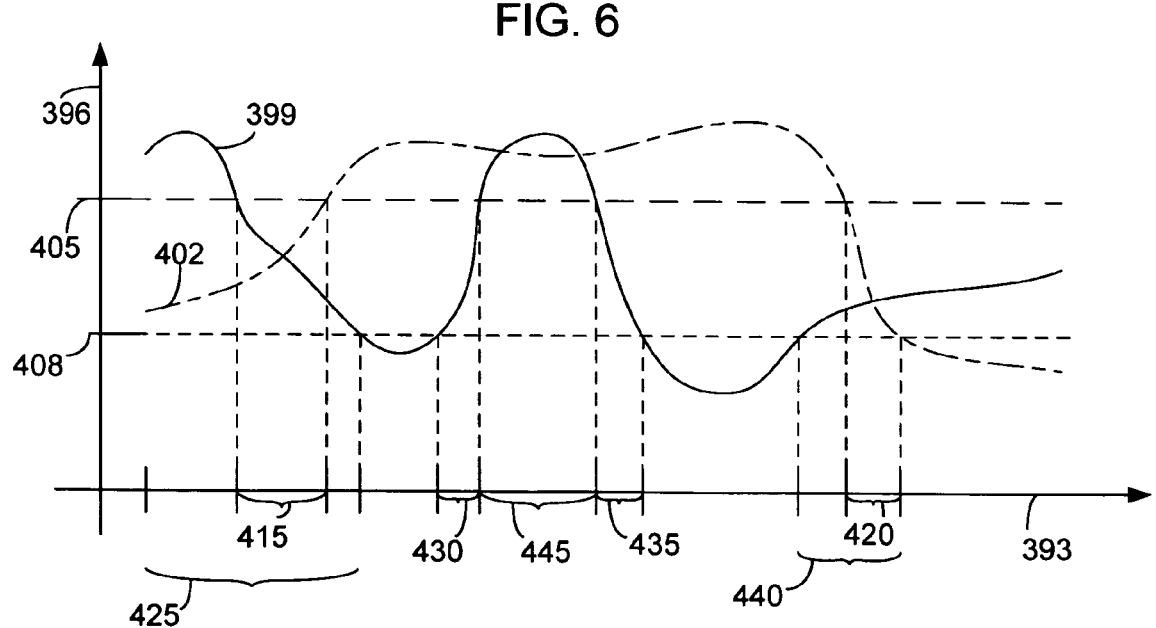

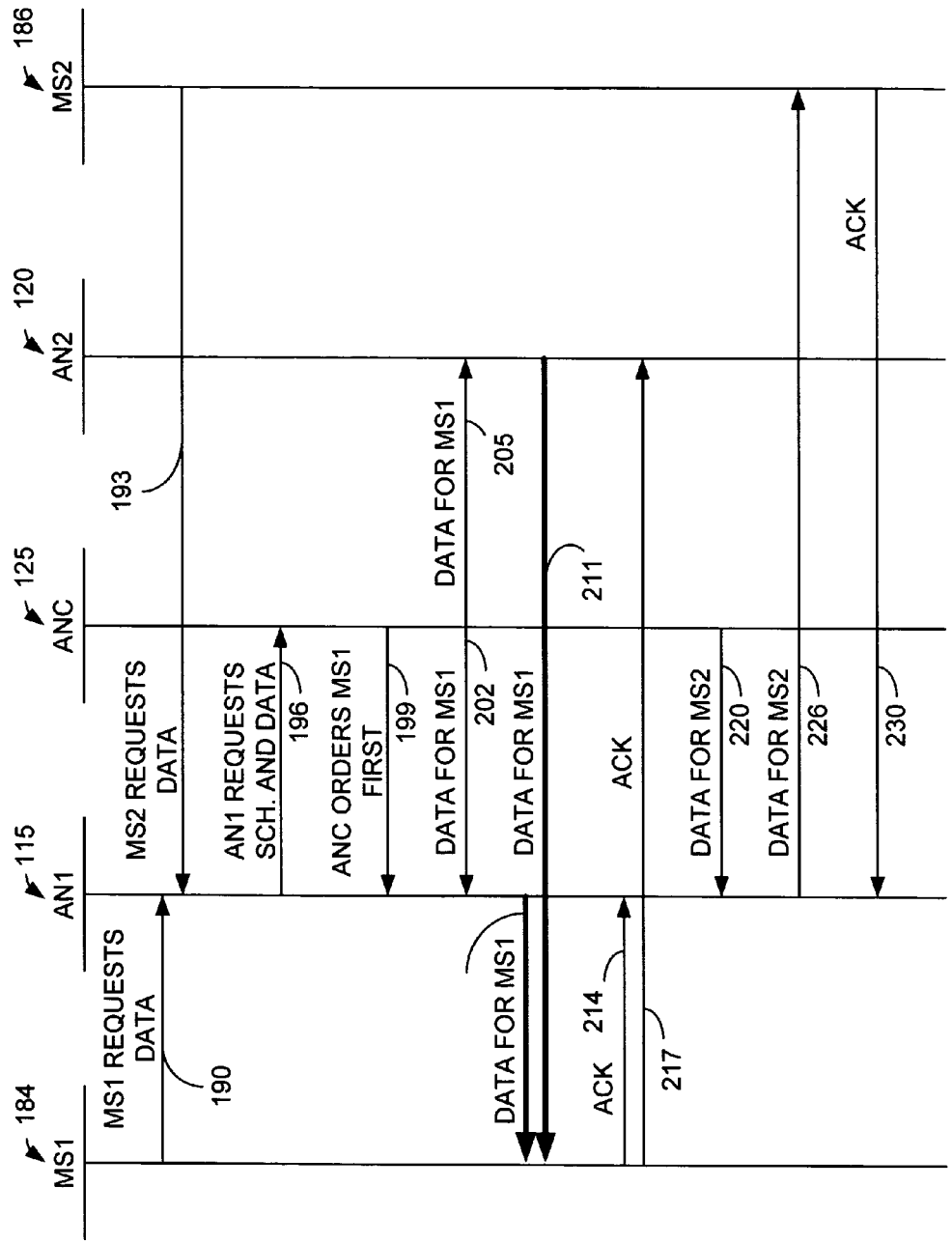

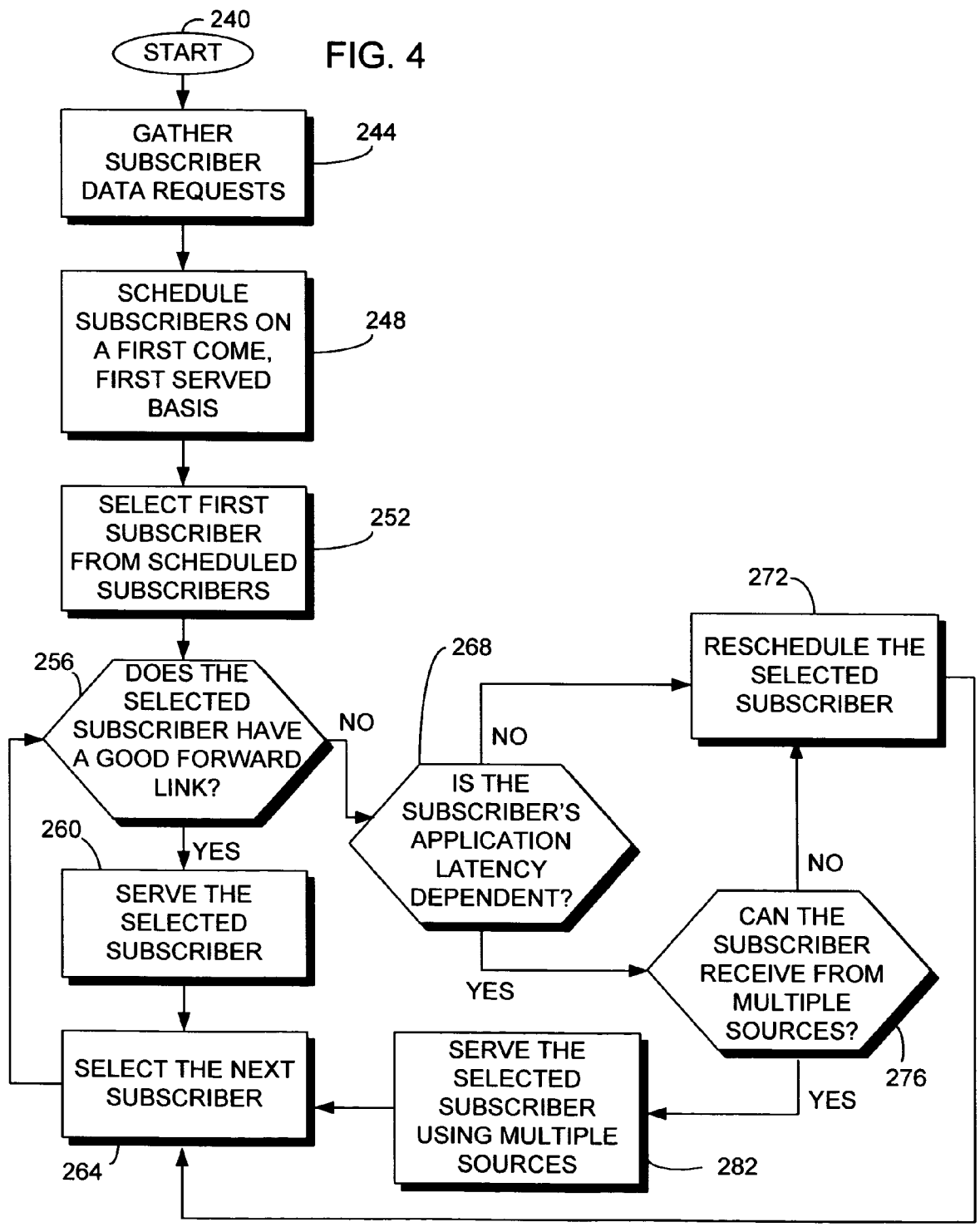

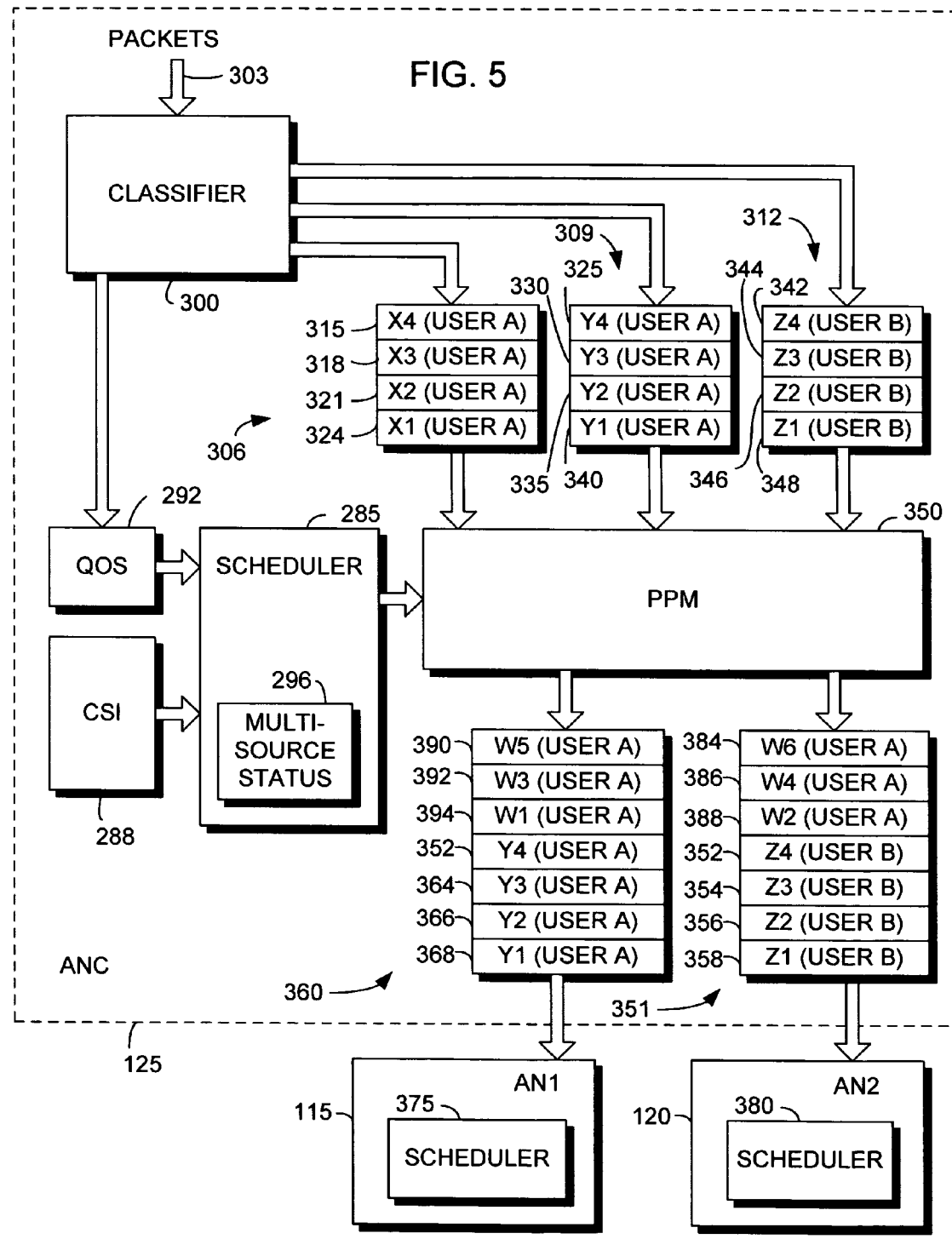

MULTIPLE SOURCE WIRELESS COMMUNICATION SYSTEM AND METHOD

BACKGROUND OF THE INVENTION

1. Field of the Invention

The invention relates to wireless communications and more particularly to data coding and decoding in wireless communications.

2. Background

System resources are often wasted when a cellular wireless communication device can communicate with multiple (more than one) transmission sources. If multiple sources transmit the same information, the sources may increase the interference in the system for other users. Additionally, more network resources may be consumed, such as, for example, by increasing back haul traffic. Back haul traffic is traffic on the network side of an air interface, such as a base station. Thus, for example, in an IS-95 system, an example of back haul is data traffic between a base station and a base station controller.

Resources are also wasted, for example, in soft hand-off (SHO) in cellular wireless communication systems such as, for example, code division multiple access (CDMA). In SHO, a mobile wireless communication device is being transferred from one base station to another base station, based on received signal levels from the two base stations. The mobile station receives data from both the base stations for short duration before a complete hand-off to the next base station is completed. See generally, TIA-2000.5-D "Upper Layer (Layer 3) Signaling Standard for cdma2000® Spread Spectrum Systems", March 2004, Section 2.6.6, pages 2-471 to 2-619. Typically in SHO, multiple base stations transmit the same information at the same time so that the receiver can combine the information at its front-end. But SHO creates waste through redundancy.

One solution to the problem is cell selection in packet data systems such as IS-856. In cell selection, the cellular wireless communication device determines which of the available transmission sources should send packets. The chosen transmission source sends the next packet, and the other available transmission sources do not send packets.

A first problem with the cell selection solution is that the transmission sources may not know which packets the cellular wireless communication device has received from other transmission sources, and therefore, the transmission sources may send multiple copies of the same packets, wasting system resources. A solution for the first problem with the cell selection solution is for the cellular wireless communication device to give a next packet indicator in a signaling or other overhead channel, to inform the transmission sources which packet to send, as described in U.S. Pat. Appl. Pub. No. 2002/0145991 A1, published on Oct. 10, 2002, which is hereby incorporated by reference in its entirety.

A second problem with the cell selection solution is increased overhead signaling. Increased overhead signaling occurs regardless of whether the cellular wireless communication device gives a next packet indicator. Increased overhead signaling occurs because the cellular wireless communication device must tell the transmission sources (1) which transmission source should transmit next and, optionally, (2) which packet should be sent next. Transmitting and tracking this information causes overhead and possibly delay in the system.

Cell-Selection also takes away the advantage of combining information from multiple base stations, especially, at the hand-off regions where signal strength from all the base stations could be weak.

SUMMARY

In some cases, as mentioned above, the reception quality from all transmission sources may be low. In such cases, cell selection may not be helpful. In such cases, it would be advantageous if packets could be received from more than one of the available transmission sources.

When a cellular wireless communication device can receive communication from multiple (more than one) transmission sources, two steps are performed. First, a block of source data made up of M packets is coded (encoded) such that that block of source data can be derived at the receiver from any K (K=M+A) out of the N packets, where A<<M, M<N and N is the total number of coded packets. Second, different subsets of the N packets are sent from each of the transmission sources. Thus, the cellular wireless communication device can receive packets from multiple transmission sources.

For example, the block of source data can be coded by Reed-Solomon (RS) coding or rateless coding such as Tornado coding or Raptor coding. (Sometimes they are also called Fountain Codes).

An example of the multiple sources is multiple base stations in a cellular communication system. Other examples of the multiple sources include multiple sectors, multiple RF channels (multiple frequencies), multiple beams (using a smart antenna system) multiple sets of tones (in an orthogonal frequency division multiplexing based system), and multi-code channel communication systems. Possible applications include W-CDMA, Wi-Max, etc.

Precious wireless communication system resources are conserved, because different transmission sources send different data. Fewer overhead messages are required. In cases where the multiple transmission sources all have poor channel conditions with the cellular wireless communication device, the cellular wireless communication device can accumulate packets from any of the transmission sources.

In real-time applications, such as, for example, voice communications, the real-time requirement may be satisfied in many cases in which the real-time requirements would otherwise fail. For example, in voice over internet protocol (VoIP) communications, a voice call may be clearer, or may avoid being dropped, whereas, in the prior art, the voice call would have missing voice data, or would have been dropped. Thus, clearer voice calls and fewer dropped calls can be achieved. In another example, better streaming video can be achieved.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which:

FIG. 1 is a block diagram illustrating a wireless communication system and method in which a mobile station receives different packets from multiple transmitters.

FIG. 2 is a block diagram illustrating a wireless communication system and method in which a mobile station receives different packets on multiple carrier frequencies.

FIG. 3 is a call flow diagram illustrating a wireless communication system and method in which a mobile station receives different packets from multiple sources.

FIG. 4 is a flow chart illustrating a wireless communication system and method in which a mobile station receives different packets from multiple sources.

FIG. 5 is a block diagram illustrating a wireless communication system and method in which a multi-source status is used as an input to a scheduler.

FIG. 6 is a graph illustrating changing transmission sources based on channel conditions from multiple sources.

DETAILED DESCRIPTION

FIG. 1 is a block diagram illustrating a wireless communication system and method in which a subscriber station 101 receives different coded packets 103, 105, 107 and 109 from multiple sources. Subscriber station 101 may be an IMT 2000 CDMA Multicarrier, also known as CDMA2000™, (hereinafter, "IMT 2000") subscriber station such as a mobile telephone, an EVDO or EVDV card in a mobile or desktop computer, a combined communication and computing device such as a personal digital assistant (PDA) or a PDA combined with a mobile telephone, commonly called a smart phone. Other examples are possible. Subscriber station 101 may or may not have multiple antennas or receive-chains.

Access network controller (ANC) 125 is connected to access node (AN) 115 and AN 120. ANC 125 includes processor 126. Processor 126 controls the functions of ANC 125. Processor 126 controls how ANC 125 interacts with the public switched telephone network (PSTN) (not shown) and the internet (not shown), which are both connected to ANC 125. Additionally, processor 126 controls how ANC 125 interacts with AN1 115 and AN2 120. Finally, processor 126 codes (encodes) source data, as will be described below. Processor 126 could, in practice, be multiple processors, and the functions of processor 126 could be implemented in hardware in part and in software in part.

As shown in FIG. 1, the multiple sources are transmitters 115 and 120. The multiple transmitters 115 and 120 may be IMT 2000 access nodes, AN1 115 and AN2 120, in an IMT 2000 network. Transmitters 115 and 120 are connected to network controller 125, which may be an IMT 2000 access network controller (ANC). AN1 115- and AN2 120 could be base stations in another type of wireless communication network, while ANC 125 could be a mobile station controller or other type of wireless communication network controller. It may even be possible in the future, based on improvements in internet and wireless telemetry, that the functions of ANC 125 will be moved to the internet in part and to the access points (e.g., AN1) in part.

AN1 115 includes antenna 117 and processor 119. Antenna 117 communicates over the air with MS 101. Processor 119 controls the functions of AN1 115, including modulating and demodulating the communications to and from MS 101. Further, processor 119 interacts with ANC 125. Processor 119 may include more than one processor, and the functions of processor 119 may be implemented in hardware in part, and in software in part.

When ANC 125 receives a request for data (whether voice data or other data) from MS 101, ANC 125 determines whether MS 101 can receive data from multiple sources. Typically, MS 101 reports all the access nodes (AN's) that MS 101 has detected. That is, MS 101 periodically scans the relevant communication channels for neighboring AN's. If MS 101 detects power in the channels of neighboring AN's (e.g., AN1 115 and AN2 120), MS 101 reports to ANC 125. ANC 125 keeps track of the AN's available for communication with MS 101. In certain circumstances, ANC may determine that MS 101 should receive data from multiple (more than one) AN's.

For example, MS 101 may be in a soft handoff (SHO) condition. A SHO condition occurs when the signal received by MS 101 from the AN that MS 101 is currently registered with (e.g., AN1 115) drops below a preselected threshold and the signal received by MS 101 from another AN (e.g., AN2 120) is greater than another preselected threshold. In that case, MS 101 or ANC 125 will attempt to handoff MS 101 from AN1 115 to AN2 120.

Previously, during the SHO, both AN1 115 and AN2 120 would transmit the same data packets to MS 101, as described in the Background section above. This allowed MS 101 to make a relatively smooth transition from AN1 to AN2. But, as also described above, it resulted in redundancy and therefore waste of network resources.

Instead, AN1 115 sends data packets 103 and 105, and AN2 120 sends data packets 107 and 109. Data packets 103, 105, 107 and 109 can also be referred to as symbol packets (SP). Ellipses 128 indicate that many more data packets may be sent by AN1 115 to MS 101. Ellipses 131 indicate that many more data packets may be sent by AN2 120 to MS 101.

Data packets 103, 105, 107 and 109 are arranged such that the first subset of data packets is sent by AN1 115, and the second subset of data packets is sent by AN2 120. For the example illustrate in FIG. 1, there are 16 total data packets. Only four are shown explicitly. The others are shown implicitly by ellipses 128 and 131.

For illustration, the data packets 103, 105, 107 and 109 are labeled with a binary number indicating their order in the total set of data packets. In this example, there are N=16 total data packets (binary 0000 to 1111). Data packet 103 is labeled "SP 0000", indicating that data packet 103 is the first symbol packet. Data packet 105 is labeled "SP 0001", indicating that data packet 105 is the second symbol packet. Data packet 107 is labeled "SP 1000", indicating that data packet 103 is the ninth symbol packet. Data packet 109 is labeled "SP 1001", indicating that data packet 105 is the tenth symbol packet. In practice, many hundreds, thousands or even millions of data packets are possible.

Data packets 103, 105, 107 and 109 are the result of coding a block of source code into a number N of coded data packets (e.g., data packets 103, 105, 107 and 109), wherein a number K of the coded data packets include a sufficient quantity of information to reconstruct the block of source data, and wherein K is less than N. Different data packets are sent by the different sources, in this case, AN1 115 and AN2 120, so that MS 101 can recover the source data from any K data packets received from AN1 115 and/or AN2 120.

For example, K might be only four. Then, MS 101 only need to successfully receives four data packets to reconstruct the block of source data. If MS 101 successfully received each of data packets 103, 105, 107 and 109, then MS 101 would not need the other data packets shown by ellipses 128 and 131. If, however, MS 101 did not successfully receive one of data packets 103, 105, 107 and 109, then MS 101 would need to successfully receive one of the data packets represented by ellipses 128 and 131.

MS 101 includes antenna 102 and processor 104. Antenna 102 communicates over the air with AN1 115 and AN1 120. MS 101 may have more than one antenna and more than one receive chain (including filters, mixers, etc.). Processor 104 controls the functions of MS 101, including modulating and demodulating the communications to and from AN1 115 and AN2 120. Further, processor 104 interacts with user interface devices (not shown), if present on MS 101, such as a speaker, a microphone, a display and a keypad. Processor 104 may include more than one processor, and the functions of processor 104 may be implemented in hardware in part, and in software in part.

It is possible that AN1 115 could send some of the same data packets as sent by AN2 120. However, it is envisioned that it will be optimal for all of the data packets sent by AN1 115 to be different from all of the data packets sent by AN2 120.

The source data can be coded by any type of coding that allows reconstruction of the source data from any K out of the N coded packets. For example, Reed-Solomon (RS) coding may be used. RS coding is described in U.S. Pat. No. 6,614,366, issued Sep. 2, 2003, which is hereby incorporated by reference in its entirety. As another example the source data can be coded by rateless coding. Rateless coding is similar to RS coding, except that in rateless coding N is not preselected and not bounded. Rateless coding is described in "Rateless Codes and Big Downloads", Petar Maymounkov and David Mazieres, NYU Department of Computer Science, unknown publication date, which is available at the web site, www.rateless.com. As still another example the source data can be coded by Tornado coding. Tornado coding is described in U.S. Pat. No. 6,411,223 B1, issued Jun. 25, 2002, which is hereby incorporated herein by reference in its entirety. As yet another example, Raptor codes can be used. Raptor codes are described in U.S. Pat. Appl. Pub. No. 2005/10847 A1, published on Jan. 13, 2005, which is hereby incorporated herein by reference in its entirety. For convenience, K is used herein, where, typically, the above references use K+A, to denote the number of packets necessary to reconstruct the source data. Thus, "K", as used herein is the same as "K+A" is typically used in the above references.

FIG. 1 has been described with respect to TIA-2000. However, the system and method described with respect to FIG. 1 is applicable to many communication systems, in which multiple sources can send to a single receiver, for example, IS-95, GSM, and Wideband Code Division Multiple Access (W-CDMA) systems.

Alternatively, the multiple sources can be two different frequencies, such as are used, for example, in IMT 2000 compliant communications systems. FIG. 2 is a block diagram illustrating a wireless communication system and method in which a mobile station receives different code packets on different carrier frequencies. FIG. 2 is similar to FIG. 1, except that in FIG. 2, MS 101 only receives data packets from one AN, that is, AN1 115. In FIG. 2, AN1 115 is capable of transmitting to a subscriber, such as MS 101, on multiple carrier frequencies. For example, AN1 115 may be an IMT 2000 AN. Inside AN1 115 is shown a frequency plot 135 of the transmission bands of AN1 115. Power 140 (or, equivalently, $S_{21}$) is plotted against frequency 145. Three transmission bands 150, 155 and 160 are shown, having center frequencies 165, 170 and 175, respectively. In the example shown, AN1 115 uses the transmission bands 150 and 160 as different transmission sources for communicating with MS 101. AN1 115 transmits data packets 103, 105 and data packets represented by ellipses 128 in transmission band 150. AN1 115 transmits data packets 107, 109 and data packets represented by ellipses 131 in transmission band 160. Transmission band 155 could also be used.

Communication path 180 represented by arrow 180 is the over the air communication path or channel for communications in transmission frequency from AN1 115 to MS 101. Communication path 182 represented by arrow 182 is the over the air communication path or channel for communications in transmission frequency from AN1 115 to MS 101.

In some conditions the communication path 180 will be good and communication path 182 will be bad. In other conditions, communication path 182 will be good and communication path 180 will be bad. In still other conditions, both communication path 180 and communication path 182 will be bad. Which of communication path 180 and 182 is good or bad may rapidly change, for example, in fast fading conditions. Advantageously, MS 101 need only receive K data packets from either path 180 or 182, and there is little or no repetition of the packets sent over paths 180 and 182.

FIG. 3 is a call flow diagram illustrating a wireless communication system and method in which a mobile station receives different code packets from multiple sources. Five entities are shown: mobile station one (MS1) 184, AN1 115, ANC 125, AN2 120 and mobile station two (MS2) 186. MS1 184 sends a request for data to AN1 115, as shown by arrow 190. MS2 186 also requests data from AN1 115, as shown by arrow 193. AN1 115 requests the data for MS1 184 and MS2 186 and a schedule (for sending the data) from ANC 125, as shown by arrow 196. As shown by arrow 199, ANC 125 orders AN1 115 to send data to MS1 184 first and afterward to send data to MS2 186. ANC 125 sends data to AN1 115 and AN2 120 for MS1 186, as shown by arrows 202 and 205, respectively. As described above with respect to FIG. 1, and as will be described more fully, below, with respect to FIG. 4, ANC 125 knows that MS1 can hear both AN1 115 and AN2 120.

There are at least two options for the data that ANC 125 sends to AN1 115 and AN2 120. In a first option, ANC 125 may send the actual data to AN1 115 and AN2 120. In the first option, AN1 115 and AN2 120 perform the coding of the data, so that the source data can be reconstructed from K out of the N coded data packets. In the first option, ANC 125 must indicate to AN1 115 and AN2 120 which data packets to send. For example, AN1 115 might send all of the odd numbered data packets, and AN2 120 might send all of the even numbered data packets. In a second option, ANC 125 performs the coding and sends only a portion of the N coded data packets to AN1 115 and another portion of the N coded data packets to AN2 120.

The partitioning of packets between AN1 115 and AN2 120 could be made to depend on channel conditions. For example, if AN1 115 has a good channel with MS 101 and AN2 120 has a bad channel with MS 101, then more data packets could be sent to AN1 115 than AN2 120. More data packets would be sent by AN1 115 than by AN2 120. For example, AN1 115 could send packets at a higher data rate than AN2 120.

Advantageously, both AN1 115 and AN2 120 send data to MS1 184, as shown by bolded arrows 208 and 211, respectively. The data sent by AN1 115 is different from the data sent by AN2 120. Specifically, MS1 184 can reconstruct the source data from any K of the data packets sent by AN1 115 and AN2 120, as described above with respect to FIG. 1. For example, MS1 185 might be in a SHO condition receiving data from AN1 115 and AN2 120.

MS1 184 sends acknowledgement messages (ACK's) to AN1 115 and AN2 120, as shown by arrows 214 and 217, respectively. ACK's 214 and 217 may be sent to acknowledge each data packet or to acknowledge that the entire source data has been reconstructed, or, similarly, to acknowledge that K data packets have been received such that the source data can be reconstructed.

Data is sent from ANC 125 to AN1 115, as shown by arrow 220. The data is sent from AN1 115 to MS2 186, as shown by arrow 225, and acknowledged, as shown by arrow 230.

Thus, even in poor channel conditions, such as, for example, SHO, MS1 184 can receive its data in the order requested. That is, MS1 184 does not have to wait until after MS2 186 is sent its data, even though MS2 186 might have better channel conditions. If MS1 184 had poor channel conditions but could only hear one AN, then MS1 184 might be scheduled to receive its data after MS2 186 received its data.

FIG. 4 is a flow chart illustrating a wireless communication system and method in which a mobile station receives different code packets from multiple sources. The method starts in step 240. Subscriber data requests are gathered in step 244. The subscribers are scheduled on a "first come, first served" basis in step 248. "First come, first served" means that the subscribers are scheduled to receive data in the order that their requests for data are received. Other scheduling schemes can also be used which are not based on "First come, first serve".

The first subscriber is selected in step 252. The system determines whether the selected subscriber has a good forward link in step 256. Any convenient criteria can be used to determine whether the subscriber has a good forward link. For example, in a power controlled system, such as, for example, IMT 2000, the forward link power control signals, can be used. Forward link power control signals and other example link quality indicators are described in U.S. Pat. App. No. 11/062,239, filed on Feb. 17, 2005, which is hereby incorporated by reference in its entirety. To continue the example, if the sum of the forward link power control bits is less than a threshold, e.g., 5, then, the subscriber is considered to have a good forward link. If the subscriber has a good forward link, then the subscriber is served in step 260. The next scheduled subscriber is selected in step 264, and then the method returns to step 256.

But if the subscriber does not have a good forward link, then it is determined whether the subscriber's application is latency dependent in step 268. Latency dependent in this context means that the subscriber cannot be rescheduled. The subscriber needs the data immediately. One example of a latency dependent application is real time voice communications. Another example of a latency dependent application is real time video, such as streaming video. Presently, such communications cannot be rescheduled, because lower quality (noise or dropped service) will be experienced if the communications are rescheduled. It may be that in the future, as communication systems become faster and bandwidth increases, such communications will be able to be rescheduled without causing noise or dropped service. However, such real time communications would always have a limit on how much they could be delayed or how many times they could be rescheduled. Thus, the systems and methods described with respect to FIG. 4 could be modified to account for how latency dependent the subscriber's application was or how much the subscriber's data was already delayed.

An example of an application that is typically not latency dependent is web page downloading. For example, if a subscriber has requested to download a web page, the subscriber's application would not be considered latency dependent in step 268. If the subscriber's application is not latency dependent, then the subscriber is rescheduled in step 272. The method returns to step 264.

If the subscriber's application is latency dependent, then it is determined whether the subscriber can receive data from multiple sources in step 276. The multiple sources may be any type of multiple sources, such as, for example, multiple transmitters, such as AN's, as described above with respect to FIG. 1. As another example, the multiple sources may be multiple carrier frequencies, as described above with respect to FIG. 2. If the subscriber cannot receive data from multiple sources, then the method returns to step 272.

But if the subscriber can receive data from multiple sources, then the selected subscriber is served using the multiple sources in step 282. Advantageously, different data packets are sent to the selected subscriber from the multiple sources.

The method described with respect to FIG. 4 could be modified as follows. One or both of steps 256 and 268 could be removed. That is, if multiple sources are available to a subscriber, the data can be sent to the subscriber by multiple sources, regardless of whether the subscriber has a good forward link and regardless of whether the subscriber's application is latency dependent. Further, if a system exists now or in the future in which subscribers can always hear multiple sources, then even step 276 could be eliminated. That is, if multiple sources are available to a subscriber, the data can be sent to the subscriber by multiple sources, without determining whether multiple sources are available to the subscriber.

FIG. 5 is a block diagram illustrating a wireless communication system and method in which a multi-source status is used as an input to a scheduler. Quality of service (QoS) can be used as an input to a scheduler, as described in U.S. Pat. No. 6,845,100 B1, issued Jan. 18, 2005, and U.S. Pat. No. 6,662,024 B2, issued Dec. 9, 2003, which are hereby incorporated by reference. U.S. Pat. No. 6,662,024 B2 further describes using channel conditions, such as signal to noise ratios, as inputs to a scheduler. However, neither U.S. Pat. No. 6,845,100 B1, nor 6,662,024 B2 suggests using a multi source status as an input to a scheduler.

Referring to FIG. 5, scheduler 285 has two inputs, channel state information (CSI) module 288 and quality of service (QOS) module 292. CSI is a collection of channel state indicator information. Channel state indicators include possibly signal to noise ratios (SNR) for each user for each AN. Other channel state indicators could be used. Importantly, scheduler 285 develops multi-source status 296 from CSI 288. That is, CSI 288 includes information, such as SNR, that lets scheduler 285 know which, if any, users can receive data from more than one source, or channel.

Incoming data packets are shown by arrow 303. The packets 303 are received by classifier 300. Classifier 300 classifies data packets according to the QOS necessary for those packets and according to the user the packets are intended for. Classifier derives this information from QOS and destination information associated with each packet. Classifier 300 sends QOS information to QOS module 292. Classifier 300 forwards the data packets to buffers for each user. The buffers may be differentiated according to QOS as well.

As shown, buffer 306 contains packets for user A, while buffer 309 also contains packets for user A. Buffer 306 contains packets 315, 318, 321 and 324. Buffer 309 contains packets 325, 330, 335 and 340. Packets 315, 318, 321 and 324 might be real-time video conferencing data packets. As real-time video conferencing packets, packets 315, 318, 321 and 324 might be a high QOS. Packets 325, 330, 335 and 340 might be a non-real time streaming video clip packets, having a relatively medium QOS. FIG. 5 does not indicate the order that packets were received. Buffer 312 contains packets 342, 344, 346 and 348, intended for user B. For example, packets 342, 344, 346 and 348 might be file transfer (FTP) packets, having a low QOS.

Scheduler 284, responds to multi-source status 296, by moving a user up in priority if the user can receive data from more than one source, as will be described more fully below with respect to FIG. 6. Referring to FIG. 5, packet processor and multiplexer (PPM) 350 multiplexes packets to AN1 and AN2, based on commands from scheduler 285. Scheduler 285 considers QOS, backlog, loading at the AN's, CSI, and multi-source status. By considering the multi-source status of each user, a user can be served by multiple sources who would not otherwise be served, or who would have only been served by one source.

PPM 350 processes packets 342, 344, 346 and 348 and sends them in data stream 351 to AN2 120 for User B, as indicated by processed packets 352, 354, 356 and 358, respectively. PPM 350 processes packets 325, 330, 335 and 340 and sends them in data stream 360 to AN1 115 for User A, as indicated by processed packets 362, 364, 366 and 368, respectively. PPM 350 could do the encoding, in which case PPM 350 is also an encoder. Alternatively, a separate encoder (not shown) could be in any convenient hardware or software in ANC 125.

Advantageously, scheduler 285 can command PPM 350 to send packets for User A to both AN1 115 and AN2 120. Scheduler 285 causes PPM 350 to send packets X1 324 and X3 318 to AN1 115, but to send packets X2 321 and X4 315 to AN2 120.

Packets for User A are sent to both AN1 115 and AN2 115 because User A can receive data from both AN1 115 and AN2 120, but more specifically, because of a QOS of the packets for User A. For example, packets 315, 318, 321 and 324 are real time video data having little latency tolerance and requiring a high QOS. More advantageously, if the above mentioned coding schemes are used, then the packets sent from AN1 115 and AN2 120 to User A can be combined to reconstruct the source data represented by packets 315, 318, 321 and 324 without regard to which of AN1 115 and AN2 120 sent the packets. This may be especially advantageous in cases where the CSI from AN1 to User A and the CSI from AN2 to User A are marginal, as will be described below with respect to FIG. 6. That is, neither AN1 115 nor AN2 120 has an adequate channel with User A to send data to User A, but combined, AN1 115 and AN2 120 can deliver sufficient packets to User A to maintain User A's QOS.

PPM 350 codes and multiplexes the four source packets 315, 318, 321 and 324 as follows. PPM 350 codes the four source packets 315, 318, 321 and 324 such that any K coded packets can be used to recover the source packets 315, 318, 321 and 324. For example, PPM 350 may code the four source packets 315, 318, 321 and 324 into six coded packets W6 384, W4 386, W2 388, W5 390, W3 392 and W1 394, such that any five of the coded packets 384, 386, 388, 390, 392 and 394 can be used to reconstruct the four source packets 315, 318, 321 and 324.

In this example, M=4, K=5 and L=1, where L is the number of additional coded packets added to the total number of coded packets, to account for loss of packets. In practice, M, K, and L will usually be much larger than four, five and one, respectively.

AN1 115 and AN2 120 may have their own schedulers 375 and 380, respectively. Schedulers 375 and 380 may reschedule the order of transmitting the received packets. For example, AN2 120 has better knowledge of the channel conditions with the users connected to AN2 120 than does ANC 125. ANC's 125 CSI information is derived from AN2's 120 CSI information, but there is a delay and/or averaging of the CSI information. In other words, AN2 120 has the CSI information in real time, and ANC 125 has the information in a form somewhat worse than real time. Thus, AN2 120, may use scheduler 380 to modify the packets scheduled by ANC 125. For example, scheduler 380 may send packets 384 and 388 before packets 352 and 354, if the channel conditions between AN2 120 and User A are better than the channel conditions between AN2 120 and User B.

Schedulers 375 and 380 are aware that certain packets are encoded differently to indicate they are multi-sourced. The AN's can further process the packets after they receive the packets from ANC. For example, at the AN's, multi-sourced packets and other packets can be further encoded or combined with other packets and encoded before transmission.

Multi-sourced information of each packet should be conveyed to the MS as well. Certain applications could always be encoded with rateless codes (also known as "fountain codes") or it can be decided between the network and the MS beforehand during a service negotiation stage (the initial stage) of an application session.

In other words, ANC scheduler 285 and AN schedulers 375 and 380 can coordinate packet scheduling and use of multi-source packet coding. The availability of multiple sources and coding types can be exchanged during a negotiation session. Further, it is possible for an ANC to inform specific ANs and the MS that some designated packets or during next a designated time or for designated slots, for example, the packets delivered to the MS will be multi-sourced and encoded differently. For example, an ANC might take these steps when ANC decides that a MS is approaching a SHO region. This will force the MS to capture signals from multiple ANs during that time period. Thus, multi-source coding can be used in a combination of application session negotiations or adaptive actions during SHO time periods.

To reduce the signaling further between the ANC, ANs and the MS, the MS can itself start capturing packets from multiple ANs after a fixed period of time, if it detects a threshold crossing, that is, if it detects a CSI dropping below a threshold, such as, for example, STH 405 (shown and described below with respect to FIG. 6). The MS will report this threshold crossing to the network and then after a fixed period of time it can automatically start capturing multiple AN packets. Further, the CSI threshold, such as STH 405, can have a selectable value. The value can be provided by the network during the negotiation session depending upon application and network environment and load.

FIG. 6 is a graph illustrating changing transmission sources based on channel conditions from multiple sources. FIG. 6 highlights the advantages of using multi-source status as an input to scheduler 285. Time 393 is plotted against a channel state indicator 396, such as, for example, SNR. The channel state indicator will be discussed in terms of SNR, but other channel state indicators could be chosen. The SNR of two sources (not shown) will be discussed. Source A (not shown) and Source B (not shown) might be AN1 115 and AN2 120, respectively (shown with respect to FIG. 1). Alternatively, Source A and Source B might be signal carrier 150 and 160, respectively (shown with respect to FIG. 2). Any two (or more) convenient wireless communication sources may be used.

Referring again to FIG. 6, Source A SNR (SNRA) 399 and Source B SNR (SNRB) 402 are plotted. Two thresholds are also shown: single source threshold (STH) 405 and multi-source threshold (MTH) 508. STH 405 represents a SNR threshold for transmitting from a transmission source to a user, from only one source. MTH 408 represents a SNR threshold for transmitting from a transmission source to a user, in the case where more than one source is used to deliver data to the user. Both STH 405 and MTH 408 could be absolute thresholds for determining that no service is available, or merely prioritization thresholds for determining that a time priority should be lowered or raised.

For example, STH 405 might be a SNR threshold used by scheduler 285 to determine whether to schedule packets for User A earlier or later in time. In the prior art, assuming User A is being served by Source A, scheduler 285 schedules packets for User A later if SNRA 399 is less than STH 405. However, it is advantageous to schedule packets for User A earlier if SNRA 399 and SNRB 402 are greater than MTH 408. During intervals 415 and 420 both SNRA 399 and SNRB 402 are less than STH 405 but greater than MTH 408. Advantageously, packets for User A can be scheduled earlier by using Source A and Source B.

In another example, STH is a threshold used by scheduler 285 to determine that no service is available. For example, STH 405 might be −6 dB (pilot Ec/No) in an IS-856 system. See TIA/EIA/IS-856-1 cdma2000 High Rate Packet Air Interface Specification. MTH 408 is lower than STH 405. MTH 408, might be −8 dB. STH 405 and MTH 408 may be optimized, especially for network throughput or QoS, by simulation and/or experimentation. In the prior art, no service would be available during intervals 415 and 420. Advantageously, packets can still be delivered to User A during intervals 415 and 420, by using both Source A and Source B.

Optionally, data might be sent by both Source A and Source B during intervals 425, 430, 435, and 440, in which both SNRA 399 and SNRB 402 are greater than MTH 408, but only one of SNRA 399 and SNRB 402 is greater than STH 405. As another option, data might also be sent by both Source A and Source B during interval 445, in which both SNRA 399 and SNRB 402 are greater than STH 405.

Further, while embodiments and implementations of the invention have been shown and described, it should be apparent that many more embodiments and implementations are within the scope of the invention. Accordingly, the invention is not to be restricted, except in light of the claims and their equivalents.

I claim:

1. A wireless communication system comprising:
   a transmission source controller;
   a processor connected to the transmission source controller and configured to code a block of source data into a number N of coded data packets, wherein a number K of the N coded data packets contains enough information to reconstruct the source data;
   a first wireless transmission source connected to the transmission source controller; and
   a second wireless transmission source connected to the transmission source controller, wherein the transmission source controller is configured to send a first subset of the N coded data packets to the first transmission source and a second subset of the N coded data packets to the second transmission source.

2. The wireless communication system of claim 1, wherein the transmission source controller comprises the processor.

3. The wireless communication system of claim 1, wherein all of the first subset of N coded data packets are different from all of the second subset of N coded data packets.

4. The wireless communication system of claim 1, wherein: the first wireless transmission source comprises a first base station; and the second wireless transmission source comprises a second base station.

5. The wireless communication system of claim 1, wherein: the first wireless transmission source comprises a first carrier signal; and the second wireless transmission source comprises a second carrier signal.

6. The wireless communication system of claim 1, wherein the processor is configured to code the block of source data using a Reed-Solomon code.

7. The wireless communication system of claim 1, wherein the processor is configured to code the block of source data using a rateless code.

* * * * *